No. 757,693.

Patented April 19, 1904.

UNITED STATES PATENT OFFICE.

JACOB TOLLNER, OF NEW YORK, N. Y., ASSIGNOR TO F. G. DOKKEN-WADEL AND H. M. GRANT, OF NEW YORK, N. Y.

BLASTING COMPOUND.

SPECIFICATION forming part of Letters Patent No. 757,693, dated April 19, 1904.

Application filed July 29, 1903. Serial No. 167,388. (No specimens.)

*To all whom it may concern:*

Be it known that I, JACOB TOLLNER, a citizen of Austria-Hungary, residing at New York, in the county of New York and State of New York, have invented certain new and useful Improvements in Blasting Compounds, of which the following is a specification.

This invention relates to blasting compounds.

The object of the invention is to produce a blasting compound which shall be practically non-explosive except under pressure, which shall not readily ignite, and which when burned in confinement produces large volumes of gas which are developed slowly and which act with great pressure to rupture masses of rock, coal, &c., when properly placed and ignited in a blast.

My invention consists in the compound which I shall now describe.

I take nitrate of potash, approximately fifteen per centum by weight; nitrate of soda, say, thirty per centum; sulfur, fifteen per centum; spent tanbark, twenty per centum. These ingredients are pulverized while in a dry state. I take of horse-manure, preferably fresh, (or if dry then moistened to a pasty consistency,) twenty per cent., and thoroughly incorporate, mix, or grind together all these ingredients. The moisture of the horse-manure produces with the other ingredients a pasty compound which will not explode under ordinary conditions while mixing, and the whole may be safely ground in a mill or mortar. When the compound is thoroughly mixed, it should be dried, when it may be broken into lumps or may be crumbled or pulverized. It is generally inadvisable to granulate the compound, as the granulation would add to the expense without increasing the efficiency.

The compound when completed may be stored in barrels or other receptacles. It is not very combustible and requires a strong steady fuse for its ignition.

The tanbark in the above compound is a woody substance which is thought to be more slowly combustible than charcoal as commonly used in gunpowder. The mixture of nitrates of soda and of potash is believed to give a better result than would either nitrate separately. The admixture of the various ingredients without dissolution of soluble material, but in a slightly-moistened condition, avoids danger in the compounding. Horse-manure in its natural state generally contains a considerable volume of gas, as may be found by chemical analysis, and when the ingredients are united as above described a blasting compound is produced which burns slowly, but with great and relatively long-continued pressure, so that by actual trial in quarries the effective work of this blasting-powder is found to be much greater than that of dynamite as commonly used.

What I claim is —

1. The blasting compound described, consisting of nitrate of potash, nitrate of soda, sulfur, tanbark, and horse-manure, combined in about the proportion specified.

2. A composition of matter consisting of nitrate of potash, approximately fifteen per centum, nitrate of soda, approximately thirty per cent., sulfur, approximately fifteen per cent., spent tanbark, approximately twenty per cent., and horse-manure, approximately twenty per cent., mixed and incorporated substantially as described.

In testimony whereof I affix my signature in presence of two witnesses.

JACOB TOLLNER.

Witnesses:
W. A. BARTLETT,
F. G. DOKKENWADEL.